(12) United States Patent
Chapman

(10) Patent No.: US 11,856,923 B2
(45) Date of Patent: Jan. 2, 2024

(54) ANIMAL COLLAR WITH IMPROVED CAMERA SIGHTLINES

(71) Applicant: Greg Chapman, Kenova, WV (US)

(72) Inventor: Greg Chapman, Kenova, WV (US)

( * ) Notice: Subject to any disclaimer, the term of this patent is extended or adjusted under 35 U.S.C. 154(b) by 230 days.

(21) Appl. No.: 17/520,636

(22) Filed: Nov. 6, 2021

(65) Prior Publication Data

US 2022/0369598 A1 Nov. 24, 2022

Related U.S. Application Data

(60) Provisional application No. 63/191,990, filed on May 22, 2021.

(51) Int. Cl.
*A01K 27/00* (2006.01)

(52) U.S. Cl.
CPC .......... *A01K 27/009* (2013.01); *A01K 27/001* (2013.01); *A01K 27/006* (2013.01)

(58) Field of Classification Search
CPC .. A01K 27/001; A01K 27/006; A01K 27/002; A01K 27/00
See application file for complete search history.

(56) References Cited

U.S. PATENT DOCUMENTS

| 10,342,217 | B2* | 7/2019 | Brown | H04N 23/662 |
|---|---|---|---|---|
| 2003/0025792 | A1* | 2/2003 | Eberhard | H04N 7/183 |
| | | | | 348/E7.087 |
| 2007/0095304 | A1* | 5/2007 | Rosenberg | A01K 29/00 |
| | | | | 119/720 |
| 2015/0099472 | A1* | 4/2015 | Ickovic | A01K 27/009 |
| | | | | 455/66.1 |
| 2016/0302392 | A1* | 10/2016 | Pantazes | A01K 27/006 |
| 2022/0201977 | A1* | 6/2022 | Bland | A01K 27/009 |

* cited by examiner

*Primary Examiner* — Kristen C Hayes
(74) *Attorney, Agent, or Firm* — YORK LAW LLC; Olen L. York, III

(57) ABSTRACT

An animal collar has an adjustable band having a first end and a second end, the first end and second mutually coupled and a platform disposed within the band. The collar has at least one adjustable arm depending from the platform disposed within the band, the adjustable arm comprising a returnably resilient elongated shaft having a first end and a second end, the second end of the shaft of the adjustable arm having a camera. A plurality of braces are disposed between the platform and the adjustable arm. The collar includes tracking and lighting.

18 Claims, 4 Drawing Sheets

ANIMAL COLLAR WITH IMPROVED CAMERA SIGHTLINES

I. RELATED APPLICATIONS

This application claims the benefit of U.S. Provisional Application No. 63/191,990, filed on May 22, 2021.

II. FIELD OF THE INVENTION

The present application discloses and describes an animal collar with improved camera sightlines.

III. BACKGROUND OF THE INVENTION

There are several examples of apparatuses, systems, and/or methods that attempt to provide surveillance of an animal and the animal's movement. For example, U.S. Pat. No. 6,720,879 (assigned to Time-N-Space Technology, Inc.) discloses an animal collar that includes a tracking and location device. In another example, U.S. Pat. No. 9,615,546 (issued to Theadore Pantazes) discloses a wearable canine and feline collar with camera and added features.

However, these examples suffer from camera feeds that fail to provide sufficient environmental specificity for an observer or handler to accurately locate the animal or the animal's location. Imprecise animal location surveillance can cause or result in multiple forms of danger or raise related problems and issues. For example, in a competition setting, imprecise location surveillance may result in inaccurate scoring and/or judging. In non-competition, imprecise location surveillance can result in injury, theft, and/or animal and/or owner anxiety.

Accordingly, there is a need for improvements with animal surveillance.

IV. SUMMARY OF THE INVENTION

In one embodiment, an animal collar comprises an adjustable band having a first end and a second end, the first end and second mutually coupled and a platform disposed within the band. The collar has an adjustable arm depending from the platform disposed within the band, the adjustable arm comprising a returnably resilient elongated shaft having a first end and a second end, the second end of the shaft of the adjustable arm having a camera. A plurality of braces disposed between the platform and the adjustable arm. The collar also has tracking means disposed on the band for transmitting the location of the collar. The collar also has lighting means disposed on the band for transmitting light from the collar.

In this aforementioned embodiment, the plurality of braces supporting the adjustable arm, the plurality of braces having sufficient flexibility to achieve displacement and adjustable orientation of the adjustable arm, wherein the combination of the plurality of braces and the adjustable arm reduces the instances of view-obstruction caused by the head positioning and/or motion of the animal to which the collar is attached.

In another embodiment, an animal collar comprises an adjustable band having a first end mutually coupled with a second end with a platform disposed within the band, the platform having an obverse surface and reverse surface, the obverse surface supporting a first coupling and a second coupling. The collar also has a first adjustable arm depending from the platform disposed within the band, the first adjustable arm comprising a returnably resilient elongated shaft having a first end and a second end, the first end of the shaft of the first adjustable arm depending from the first coupling, the first coupling providing measured articulation to the first adjustable arm, and the second end of the shaft of the first adjustable arm having a first camera. Similarly, the collar also has a second adjustable arm depending from the platform disposed within the band, the second adjustable arm comprising a returnably resilient elongated shaft having a first end and second end, the first end of the shaft of the second adjustable arm depending from the second coupling, the second coupling providing measured articulation to the second adjustable arm, and the second end of the shaft of the second adjustable arm having a second camera. A plurality of braces disposed between the platform and the first adjustable arm and the second adjustable arm, the plurality of braces supporting the first adjustable arm and the second adjustable arm, the plurality of braces having sufficient flexibility to achieve displacement and adjustable orientation of the first adjustable arm and the second adjustable arm, wherein the combination of the plurality of braces and the first adjustable arm and the second adjustable arm reduces the instances of view-obstruction caused by the head positioning and/or motion of the animal to which the collar is attached. The collar also has tracking means disposed on the band for transmitting the location of the collar. The collar also has lighting means disposed on the band for transmitting light from the collar.

In another embodiment, an animal collar comprises an adjustable band having a first end mutually coupled with a second end with a platform disposed within the band, the platform having an obverse surface and reverse surface, the obverse surface supporting a first coupling and a second coupling. The collar also has a first adjustable arm depending from the platform disposed within the band, the first adjustable arm comprising a returnably resilient elongated shaft having a first end and a second end, the first end of the shaft of the first adjustable arm depending from the first coupling, the first coupling providing measured articulation to the first adjustable arm, and the second end of the shaft of the first adjustable arm having a first camera. Similarly, the collar also has a second adjustable arm depending from the platform disposed within the band, the second adjustable arm comprising a returnably resilient elongated shaft having a first end and second end, the first end of the shaft of the second adjustable arm depending from the second coupling, the second coupling providing measured articulation to the second adjustable arm, and the second end of the shaft of the second adjustable arm having a second camera. A plurality of braces disposed between the platform and the first adjustable arm and the second adjustable arm, the plurality of braces supporting the first adjustable arm and the second adjustable arm, the plurality of braces having sufficient flexibility to achieve displacement and adjustable orientation of the first adjustable arm and the second adjustable arm, wherein the combination of the plurality of braces and the first adjustable arm and the second adjustable arm reduces the instances of view-obstruction caused by the head positioning and/or motion of the animal to which the collar is attached. The collar also has tracking means disposed on the band for transmitting the location of the collar. The collar also has lighting means disposed on the band for transmitting light from the collar. The collar further has an Internet application interface having a remote input interface capability and a remote receiver interface capability, the application interface allowing for actuation of one or more options provided within the system, the receiver interface allowing a user to access images and data collected.

In each of the multi-arm embodiments described above, the following additional features are envisioned. For example, the band comprises the first end and the second end that are mutually coupled via a secure locking mechanism to prevent tampering and/or removal.

For each of the embodiments, the secure locking mechanism may comprises a variety of options, including key and lock, a biometric interface, an electronic interface, and/or a combination of these features.

For each of the embodiments, the platform rotable with the band for selective orientation of the platform and the first coupling and the second coupling depending therefrom.

For each of the embodiments, the first coupling and the second coupling provides 360 degrees of articulation in approximate parallel orientation to the platform and providing approximately 180 degrees of articulation in approximate perpendicular orientation to the platform. Each one of the first coupling and the second couple comprises control means, the control means for temporarily securing the orientation of the first adjustable arm relative to the first coupling and the orientation of the second adjustable arm relative to the second coupling.

V. BRIEF DESCRIPTION OF THE DRAWING(S)

VI. DETAILED DESCRIPTION OF THE EMBODIMENT(S)

It will be readily understood that the components of the present invention, as generally described and illustrated in the figures herein, may be arranged and designed in a wide variety of different configurations. Thus, the following detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1A:
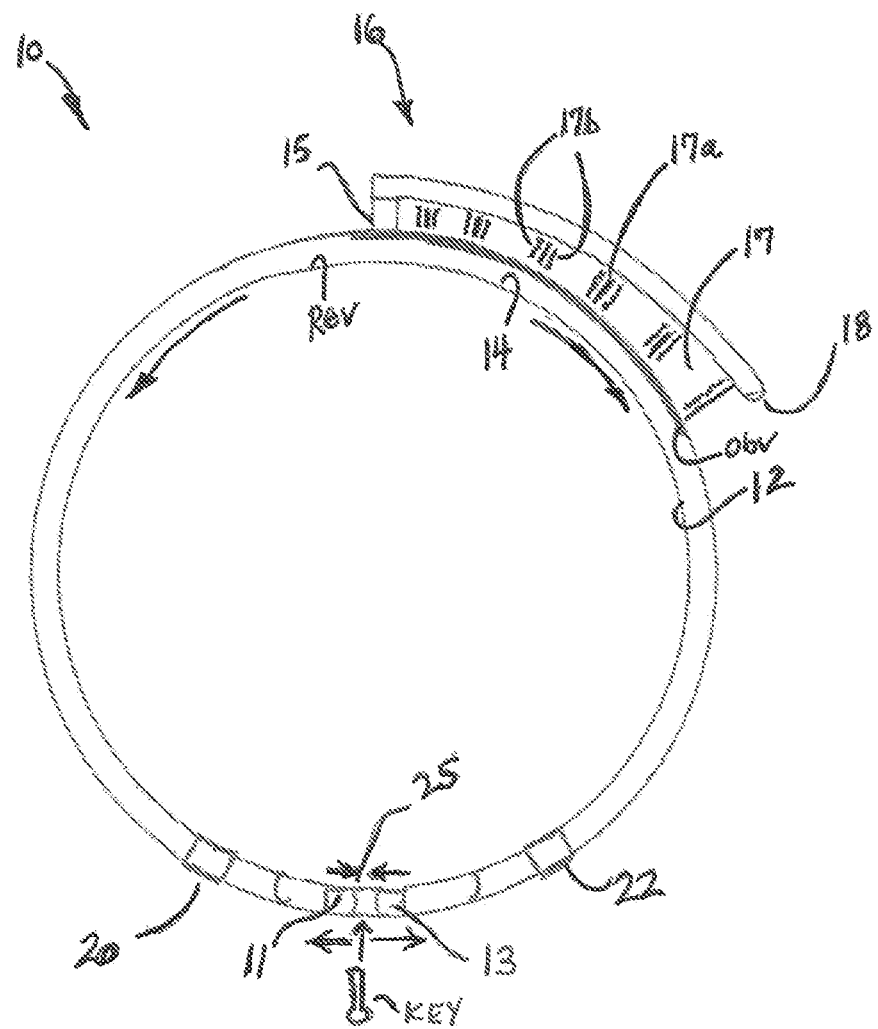
FIG. 1a is a top view of an animal collar.
Figure 1B:
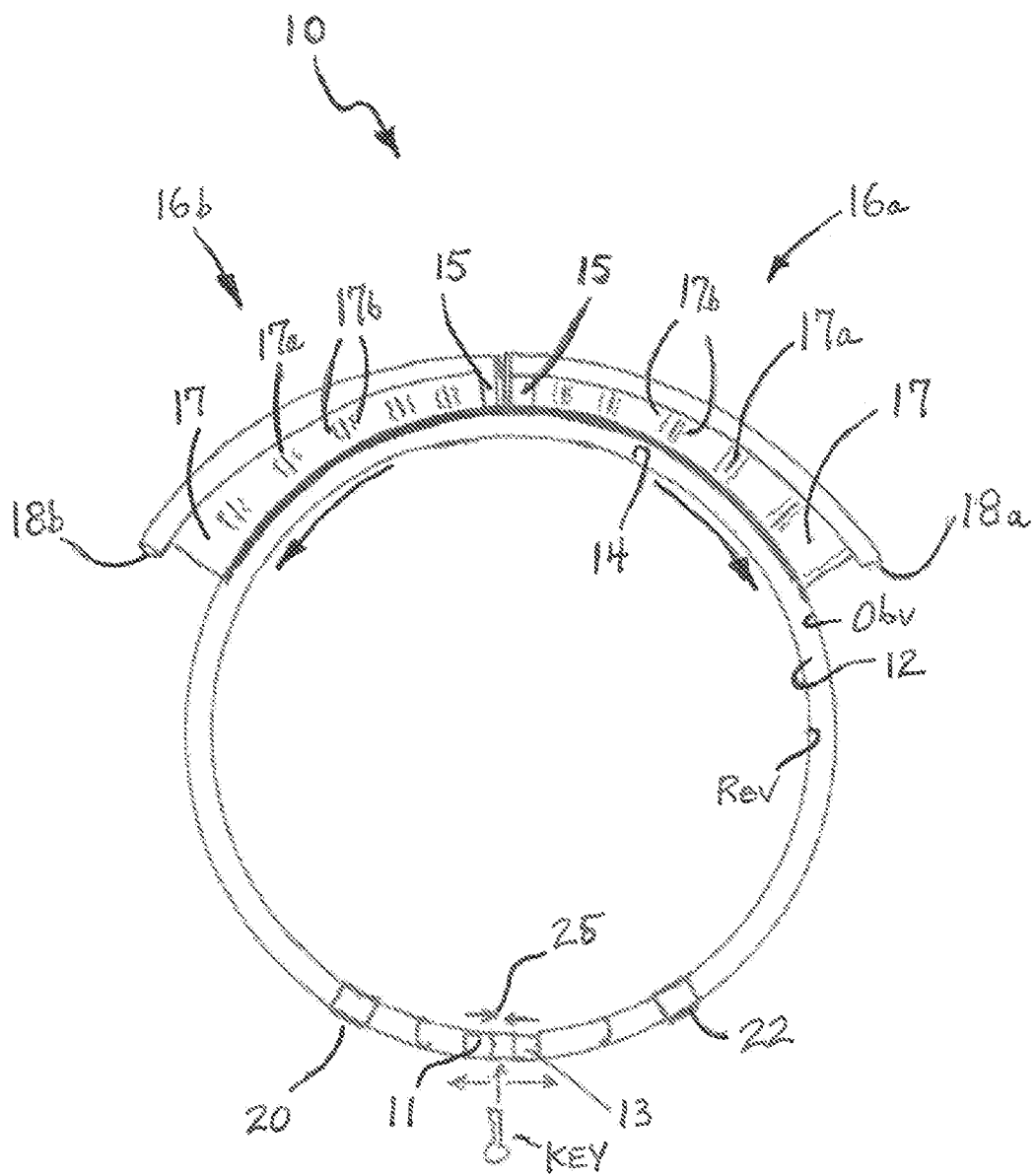
FIG. 1b is a top view of an animal collar with multiple arms and multiple cameras.
Figure 2A:
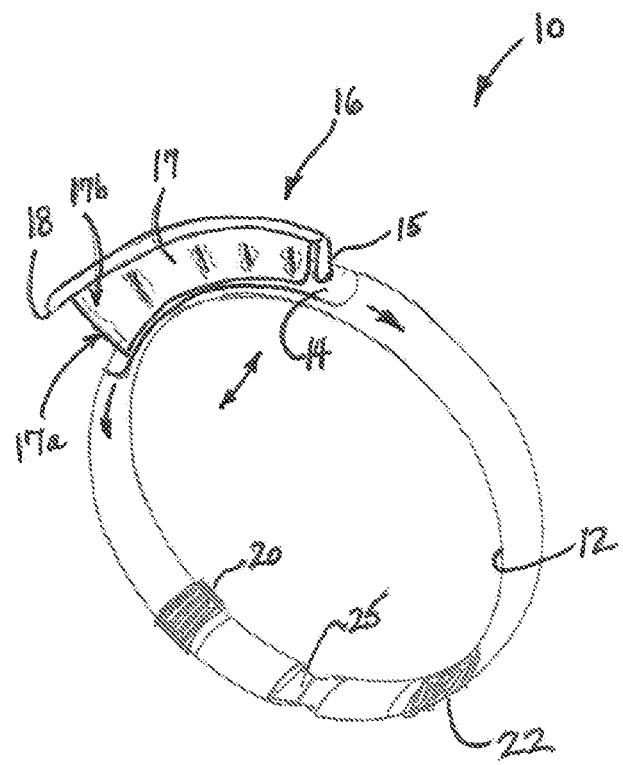
FIG. 2a is a perspective view of FIG. 1a with the arm extended.
Figure 2B:
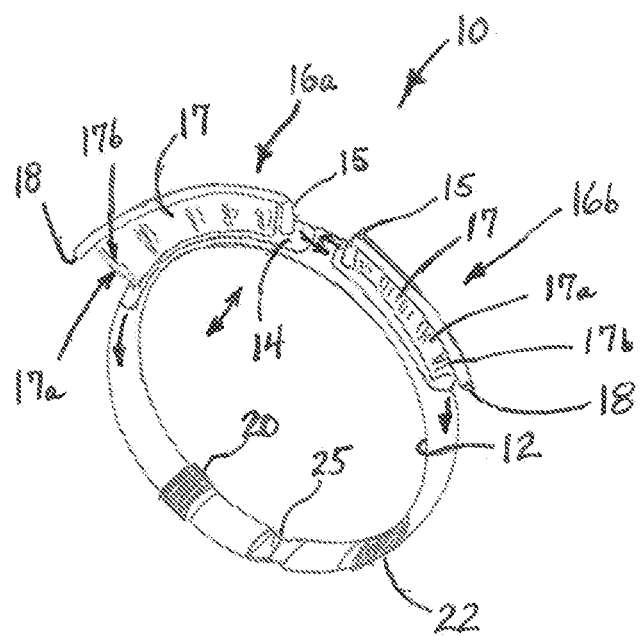
FIG. 2b is a perspective view of the animal collar depicted in FIG. 1b with multiple arms and multiple cameras, with arms extended.
Figure 3:
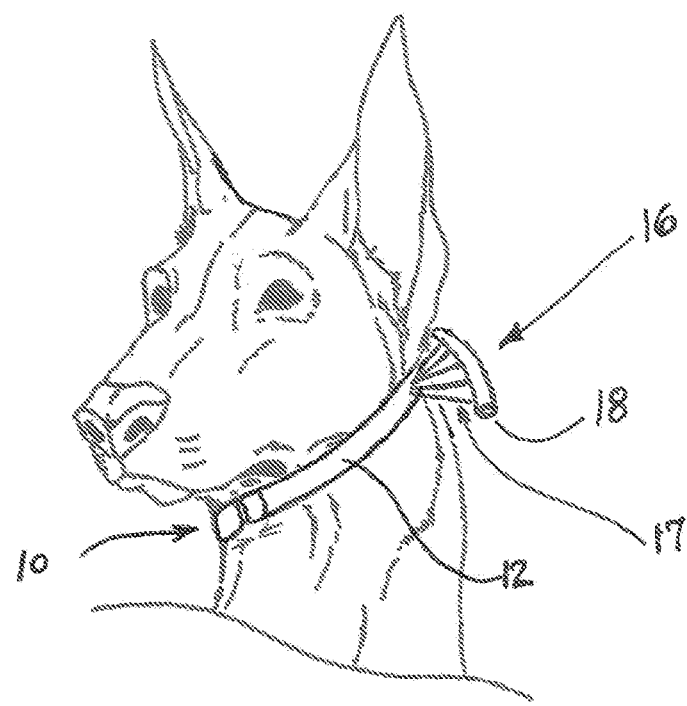
FIG. 3 is a perspective view of FIG. 1 secured to the neck of an animal (dog)

In accordance with the drawings illustrating at least one embodiment, as generally depicted in FIG. 1a, FIG. 2a, and FIG. 3, an animal collar 10 apparatus or device comprises a band 12 supporting a platform 14, at least one arm 16 depending from the platform 14, and a camera 18 depending from the arm 16. Consistent with FIG. 1b and FIG. 2b, it is envisioned that another embodiment describes an animal collar 10 apparatus or device having at least two arms 16 depending from the platform 14 (or separately depending from multiple platforms) with a dedicated camera 18 separately depending from each of the arms 16.

Consistent with FIGS. 1 through 4, a single arm 16 embodiment is described and disclosed. The single arm 16 is adjustable about the circumference of the collar 10. The adjustment of the single arm 16 about the circumference of the collar 10 allows for the user/owner to adjust and place the camera 18 at the end of the arm 16 in a defined position or location.

Consistent with FIGS. 1b and 2b, a multiple arm 16a and 16b embodiment is described and disclosed. The multiple arm (in this specific embodiment a first arm 16a and a second arm 16b) are each adjustable about the circumference of the collar 10. In one such embodiment, consistent with FIG. 1b, the first arm 16a and the second arm 16b are collectively adjustable, with the respective cameras 18a and 18b mutually fixed at a defined interval relative to the other camera. The first arm 16a and second arm 16b are adjustable along a single platform 14. In another such embodiment, consistent with FIG. 2b, the arms 16a and 16b are independently adjustable along different segments of a single platform 14 (or alternatively along different platforms 14 provided within the neck of the collar 10).

Regardless of which embodiment is selected, the elements of the single camera embodiment and the multiple camera embodiment are essentially similar and share many of the similarly referenced components. Accordingly, the following description provides the essential details of the elements comprising the multiple embodiments described above. In the multiple arm and multiple camera embodiments, the additional arm(s) and camera(s) may be alternatively labeled and distinguished by the use of "a" and "b" in similarly described elements and their respective reference characters.

The collar 10 may include one or more braces 17 depending from the platform 14 and providing subjacent support to the arm 16 (or in support of each arm). The collar 10 may also include tracking means 20 for precision location of the collar 10 and/or animal to which the collar is secured. The collar 10 may also include a light or plurality of lights 22 for illumination when desired.

In one embodiment defining a system 1000, the collar 10 comprising the band 12, the platform 14 (or multiple platforms), the arm 16 (or multiple arms), one or more braces 17, and the camera 18 (or multiple cameras) may be integrated within the system 1000 that utilizes a web and/or mobile device application 500 for operating and controlling various elements of the collar 10 and its components. In another embodiment of the system 1000, the collar 10 comprising the band 12, the platform 14 (or multiple platforms), the arm 16 (or multiple arms), the one or more braces 17, the camera 18 (or multiple cameras), and the tracking means 20 may be integrated within the system 1000 that utilizes the application 500. In another embodiment of the system 1000, the collar 10 comprising the band 12, the platform 14 (or multiple platforms), the arm 16 (or multiple arms), the one or more braces, the camera 18 (or multiple cameras), and the light or lights 22 may be integrated within the system 1000 that utilizes the application 500. In another embodiment of the system 1000, the collar 10 comprising the band 12, the platform 14 (or multiple platforms), the arm 16 (or multiple arms), the camera 18 (or multiple cameras), and the integration of the tracking means 20 and the light or lights 22 within the system 1000 that utilizes the application 500. In another embodiment of the system 1000, the collar 10 comprising the band 12, the platform 14 (or multiple platforms), the arm 16 (or multiple arms), the camera 18 (or multiple cameras), and the integration of tracking means 20 and light or lights 22 in combination with means for operating and controlling various elements of the collar 10 and its components.

It is envisioned that the band 12 may be adjustable along its length to accommodate various dimensions of neck sizes of an animal.

It is envisioned that the band 12 may include a first end 11 and a second end 13 that may be mutually coupled or joined to form the collar-shape generally about the neck of an animal. Mutual coupling may be accomplished by a variety of means, including buckle and D-ring configurations, side-release friction-fit male and female buckle configurations, and other similar configurations.

It is further envisioned that the mutual coupling of end 11 and end 13 of the band 12 may be securely effectuated through the utilization of a key and lock mechanism 25 that is operatively coupled to one or more of the electronic components disclosed in further detail below, whereby locking the mechanism 25 engages the electronic components and unlocking the mechanism disengages the electronic components. In another embodiment, the mechanism 25 receives and retains an end 11 or 13 of the band 12 by securing the end 11 or 13 in place within the mechanism 25, preventing unauthorized adjustment of the band 12 length/circumference. Such embodiments provide additional security by making the collar 10 difficult to use by someone other than the owner or authorized user/handler, wherein the mechanism 25 is not easily defeated without the key, which is necessary to engage and disengage the electronic components of the device and which releases an end 11 or 13 of the band 12 to allow for adjustment and/or removal of the band 12 as warranted. The mechanism 25 may comprise a variety of configurations, including a key and lock combination, a biometric interface, an electronic interface, or other similar configurations or combinations of configurations.

The platform 14 (or each platform if multiples are provided) comprises an obverse surface "Obv" and a reverse surface "Rev", with the obverse surface supporting a coupling 15 that receives and retains one end of the arm 16. The coupling 15 may comprise a variety of forms or types such as swivel couplings, ball joints, or the like. The coupling 15 is envisioned to provide articulation to the arm 16, including approximately 360 degrees of articulation in approximate parallel orientation to the platform 14 and including approximately 180 degrees of articulation in approximate perpendicular orientation to the platform 14. The platform 14 and coupling 15 provide versatile adjustability to the arm 16 (and to the camera 18 mounted or coupled to the end of the arm 16), thereby allowing the arm 16 to be positioned at several distinct positions to optimize environmental observation by the user(s) via the camera 18 on the end of the arm 16. It is envisioned that the coupling 15 is not freely swinging or otherwise uncontrolled, but rather that the coupling 15 includes means or elements that holds the positioning of the coupling 15 and the arm 16 depending therefrom. To effectuate the fixed positioning of the coupling 15 and the arm 16 depending therefrom, it is envisioned that the coupling 15 may include a catch or the like to maintain the desired position of the coupling 15 and the arm 16, with articulation of the coupling 15 (and arm 16) achieved by release of the catch, articulation of the coupling 15 (and arm 16), and engagement of the catch to maintain the desired positional selection.

The arm 16 (or each arm if multiples are provided and denoted by 16a and 16b) comprises an elongated shaft having a first end joined to the coupling 15 and a second end housing the camera 18 (denoted by 18a and 18b if referencing multiple cameras). The first end and the second end are mutually opposed. It is further envisioned that the arm 16 may comprise a variety of materials, including metal, plastic, thermoplastic, polymers, and the like, and/or combinations thereof. In one embodiment, the arm 16 comprises a thermoplastic material that has returnably-resilient characteristics so that the arm 16 may be slightly deformed and result in a non-linear arrangement that provides additional positioning of the arm 16 and the camera 18 depending therefrom. Another variant of this type of returnably-resilient material includes metal (flexible) hose cable or similar material. It is further envisioned that the arm 16 may comprise multiple shafts to achieve a telescoping arrangement to further optimize arm 16 and camera 18 position and orientation.

One or more braces 17 may be included, wherein the brace(s) 17 are upwardly depending from the platform 14 and providing subjacent support to the arm 16 and the camera 18 therein. The brace(s) 17 may have a variety of forms, including the use of one or more individual braces 17a that interconnect the platform 14 and arm 16 in a manner that provides stability and flexibility to the combination. The individual braces may comprise a linear or curvilinear form or shape and may further include a relative range of rigidity and flexibility to accommodate some displacement of the arm 16 relative to the platform 14 during movement of the animal. It is further envisioned to allow for displacement and return of the arm 16 relative to the platform 14 if an object is encountered, such as brush, limbs, thickets, or the like. The individual braces may comprise a variety of materials, including strong, durable yet flexible materials such as flexible metal(s), plastic(s), thermoplastic(s), resin(s), rubber(s), polymer(s), and the like. It is further envisioned that the one or more braces 17 may be protected by a glove, guard, shield, or covering, and may further include one or more pleats 17b providing additional returnably resilient flexibility to the brace 17 assembly.

The camera 18 (or each camera if multiples are provided and denoted by 18a and 18b) may include a variety of available image transmission and/or capture options available. For example, it is envisioned that the camera 18 may comprise a micro camera, a sub-miniature camera, a miniature camera, or the like. As indicated in FIG. 3, and in combination with the arm 16, the camera 18 is envisioned to depend from the end of the arm 16 opposite the end joined to the coupling 15, with the camera 18 disposed to provide a wide-angle or field of view for one viewing the images remotely via a smart device. The variable position flexibility provided by the arm 16 and camera 18 combination reduces the instances of view-obstruction, especially caused by the head positioning and/or motion of the animal to which the collar 10 is attached.

It is envisioned that in embodiments including multiple cameras 18, the utilization of the images and/or video captured by each camera may be rendered in different manners. For example, one option might include the capability of have separate image/video feeds that are separately viewable via an application (app) provided on a device. In a different example, another option might include the capability of merging the images/video into an aggregated output.

The tracking means 20 may include one or more technologies presently available. For example, satellite tracking and the more familiar global positioning systems (GPS) that utilize satellites to track objects, is one possible component. In another example, radio frequency identification (RFID) and/or radio tracking may be similarly employed. It is further envisioned that a combination of the aforementioned systems might be utilized, especially to provide redundancy in the event that the other system fails to operate because of transmission and/or other failures.

The light or lights 22 may include low intensity bulbs and/or arrays. The light or lights 22 are intended to allow the tracker to better visually detect the animal with animal collar 10, therefore low intensity bulb(s) and/or arrays are preferred.

It is envisioned that the animal collar 10 and/or the system 1000 incorporating the animal collar 10 may be utilized in several different contexts, including hunting/tracking, search and recovery/rescue, police and/or military uses, and/or general animal surveillance.

In particular, the collar 10 and/or system 1000 are particularly useful for judging and/or scoring competition hunts in which a dog or dogs are used to identify game, including pointing and/or flushing game from protective covering. Competition hunts can be organized a variety of animals, including predatory animals (e.g., fox, raccoon, coyote), non-predatory animals (e.g., squirrel, rabbit, turkey), waterfowl (e.g., ducks), upland birds (e.g., grouse, pheasant, quail, partridge), as well as other animals traditionally subject to hunting laws and regulations. More specifically, in competition hunts, a dog or group of dogs is/are judged and scored by competition judges based on a variety of criteria, including hunting, trailing, cry (full cry), and marking, among other possible criteria. However, to overcome the subjective nature of some of the judging criteria, and improve scoring accuracy and increase the value of the individual dogs utilized in the competition hunt, the collar 10 and/or system 1000 may be placed on the slowest dog in the pack or group so that full-field image streaming may be captured in virtual real-time. By placing the collar 10 and/or system 1000 on the slowest dog in the pack or group, a judge or judges can more accurately assess the relative positions of each competing dog for any of the criteria used, yielding more accurate individual scores for each dog and improved accuracy in evaluating the relative monetary value of each dog.

Figure 4:
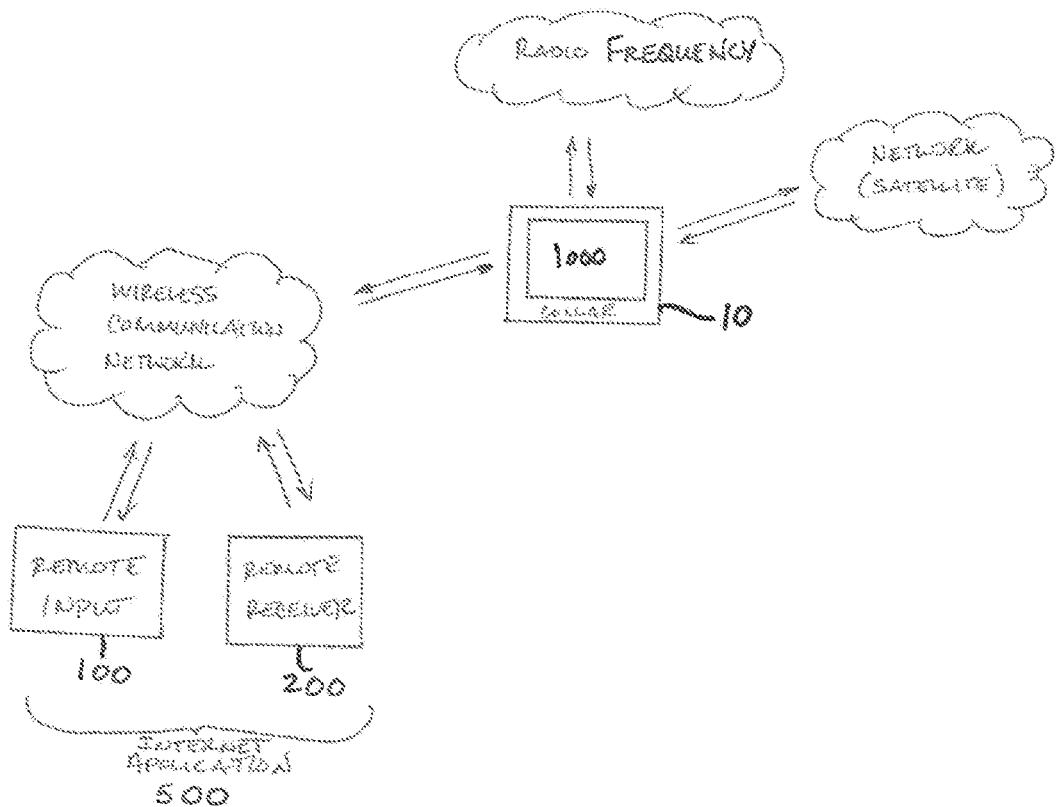
FIG. 4 is a schematic of the system disclosed herein.

Consistent with FIG. 4, the system 1000 includes the collar 10 and embodiments disclosed herewith, and in communication with an Internet application 500 having a remote input interface capability 100 and a remote receiver interface capability 200. The input interface capability 100 allows for actuation of one or more options provided within the system 1000. The receiver interface capability 200 allows for a user to access images, including live-stream video and/or still images, as well as data generated and/or collected during the course of usage. The collar 10, the application 500 (and the input 100, and the receiver 200) are operatively coupled and in communication with one another. In one embodiment, as depicted in FIG. 4, the communication coupling is achieved through wireless transmission, including use of the Internet as generally understood. It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. An animal collar comprising:
   an adjustable band having a first end and a second end, the first end and second mutually coupled;
   a platform disposed within the band;
   an adjustable arm depending from the platform disposed within the band, the adjustable arm comprising a returnably resilient elongated shaft having a first end and a second end, the second end of the shaft of the adjustable arm having a camera;
   a plurality of braces disposed between the platform and the adjustable arm;
   tracking means disposed on the band for transmitting the location of the collar;
   lighting means disposed on the band for transmitting light from the collar.

2. The animal collar of claim 1, the plurality of braces supporting the adjustable arm, the plurality of braces having sufficient flexibility to achieve displacement and adjustable orientation of the adjustable arm, wherein the combination of the plurality of braces and the adjustable arm reduces the instances of view-obstruction caused by the head positioning and/or motion of the animal to which the collar is attached.

3. An animal collar comprising:
   an adjustable band having a first end mutually coupled with a second end;
   a platform disposed within the band, the platform comprising an obverse surface and reverse surface, the obverse surface supporting a first coupling and a second coupling;
   a first adjustable arm depending from the platform disposed within the band, the first adjustable arm comprising a returnably resilient elongated shaft having a first end and a second end, the first end of the shaft of the first adjustable arm depending from the first coupling, the first coupling providing measured articulation to the first adjustable arm, and the second end of the shaft of the first adjustable arm having a first camera;
   a second adjustable arm depending from the platform disposed within the band, the second adjustable arm comprising a returnably resilient elongated shaft having a first end and second end, the first end of the shaft of the second adjustable arm depending from the second coupling, the second coupling providing measured articulation to the second adjustable arm, and the second end of the shaft of the second adjustable arm having a second camera;

a plurality of braces disposed between the platform and the first adjustable arm and the second adjustable arm, the plurality of braces supporting the first adjustable arm and the second adjustable arm, the plurality of braces having sufficient flexibility to achieve displacement and adjustable orientation of the first adjustable arm and the second adjustable arm, wherein the combination of the plurality of braces and the first adjustable arm and the second adjustable arm reduces the instances of view-obstruction caused by the head positioning and/or motion of the animal to which the collar is attached;

tracking means disposed on the band for transmitting the location of the collar; and lighting means disposed on the band for transmitting light from the collar.

4. The animal collar of claim 3, wherein the first end and the second end are mutually coupled via a secure locking mechanism to prevent tampering and/or removal.

5. The animal collar of claim 4, wherein the secure locking mechanism comprises a key and lock.

6. The animal collar of claim 4, wherein the secure locking mechanism comprises a biometric interface.

7. The animal collar of claim 4, wherein the secure locking mechanism comprises an electronic interface.

8. The animal collar of claim 3, wherein the platform rotable with the band for selective orientation of the platform and the first coupling and the second coupling depending therefrom.

9. The animal collar of claim 3, wherein the first coupling and the second coupling provides 360 degrees of articulation in approximate parallel orientation to the platform and providing approximately 180 degrees of articulation in approximate perpendicular orientation to the platform.

10. The animal collar of claim 9, wherein each one of the first coupling and the second couple comprises control means, the control means for temporarily securing the orientation of the first adjustable arm relative to the first coupling and the orientation of the second adjustable arm relative to the second coupling.

11. An animal collar comprising:

an adjustable band having a first end mutually coupled with a second end;

a platform disposed within the band, the platform comprising an obverse surface and reverse surface, the obverse surface supporting a first coupling and a second coupling;

a first adjustable arm depending from the platform disposed within the band, the first adjustable arm comprising a returnably resilient elongated shaft having a first end and a second end, the first end of the shaft of the first adjustable arm depending from the first coupling, the first coupling providing measured articulation to the first adjustable arm, and the second end of the shaft of the first adjustable arm having a first camera;

a second adjustable arm depending from the platform disposed within the band, the second adjustable arm comprising a returnably resilient elongated shaft having a first end and second end, the first end of the shaft of the second adjustable arm depending from the second coupling, the second coupling providing measured articulation to the second adjustable arm, and the second end of the shaft of the second adjustable arm having a second camera;

a plurality of braces disposed between the platform and the first adjustable arm and the second adjustable arm, the plurality of braces supporting the first adjustable arm and the second adjustable arm, the plurality of braces having sufficient flexibility to achieve displacement and adjustable orientation of the first adjustable arm and the second adjustable arm, wherein the combination of the plurality of braces and the first adjustable arm and the second adjustable arm reduces the instances of view-obstruction caused by the head positioning and/or motion of the animal to which the collar is attached;

tracking means disposed on the band for transmitting the location of the collar;

lighting means disposed on the band for transmitting light from the collar; and an Internet application interface having a remote input interface capability and a remote receiver interface capability, the application interface allowing for actuation of one or more options provided within the system, the receiver interface allowing a user to access images and data collected.

12. The animal collar of claim 11, wherein the first end and the second end are mutually coupled via a secure locking mechanism to prevent tampering and/or removal.

13. The animal collar of claim 12, wherein the secure locking mechanism comprises a key and lock.

14. The animal collar of claim 12, wherein the secure locking mechanism comprises a biometric interface.

15. The animal collar of claim 12, wherein the secure locking mechanism comprises an electronic interface.

16. The animal collar of claim 11, wherein the platform rotable with the band for selective orientation of the platform and the first coupling and the second coupling depending therefrom.

17. The animal collar of claim 11, wherein the first coupling and the second coupling provides 360 degrees of articulation in approximate parallel orientation to the platform and providing approximately 180 degrees of articulation in approximate perpendicular orientation to the platform.

18. The animal collar of claim 17, wherein each one of the first coupling and the second couple comprises control means, the control means for temporarily securing the orientation of the first adjustable arm relative to the first coupling and the orientation of the second adjustable arm relative to the second coupling.

* * * * *